(12) United States Patent
Yu et al.

(10) Patent No.: US 8,149,164 B2
(45) Date of Patent: Apr. 3, 2012

(54) SYSTEM FOR DEMODULATING NAVIGATION BITS FROM SATELLITE SIGNALS

(75) Inventors: Xiaoguang Yu, Chengdu (CN); Haiquan Huang, Wuhan (CN); Jinghua Zou, Wuhan (CN); Lin Li, Chengdu (CN); Bo Yu, Chengdu (CN); Weihua Zhang, Chengdu (CN); Lie Lu, Chengdu (CN)

(73) Assignee: O2Micro International, Ltd., Grand Cayman (KY)

( * ) Notice: Subject to any disclaimer, the term of this patent is extended or adjusted under 35 U.S.C. 154(b) by 210 days.

(21) Appl. No.: 12/650,154

(22) Filed: Dec. 30, 2009

(65) Prior Publication Data
US 2010/0328156 A1   Dec. 30, 2010

(30) Foreign Application Priority Data
Jun. 30, 2009   (CN) .......................... 2009 1 0158461

(51) Int. Cl.
*G01S 19/37* (2010.01)

(52) U.S. Cl. ................................................ 342/357.77
(58) Field of Classification Search .............. 342/357.77
See application file for complete search history.

(56) References Cited

U.S. PATENT DOCUMENTS
2006/0274821 A1 * 12/2006 Chen et al. .................. 375/149
2008/0025151 A1 *  1/2008 Urano et al. ................. 368/14
* cited by examiner

*Primary Examiner* — Harry Liu
(74) *Attorney, Agent, or Firm* — Wang Law Firm, Inc.; Li K. Wang

(57) ABSTRACT

A signal processing system for demodulating navigation bits from a satellite signal is disclosed herein. The signal processing system includes a digital baseband processor for determining a boundary between two navigation bits in the navigation bits according to a first plurality of coarse acquisition (C/A) codes captured from the satellite signals, storing the first plurality of C/A codes, and demodulating a second plurality of C/A codes captured after determining the boundary to recover a first series of the navigation bits. The signal processing system further includes a complementary demodulating unit coupled to the digital baseband processor for demodulating the first plurality of C/A codes to recover a second series of the navigation bits.

14 Claims, 7 Drawing Sheets

SYSTEM FOR DEMODULATING NAVIGATION BITS FROM SATELLITE SIGNALS

FIELD OF THE INVENTION

The present invention relates to a navigation system, more specifically, relates to system for processing satellite signal in a navigation system.

BACKGROUND OF THE INVENTION

Nowadays, global positioning systems (GPS) are widely used in many applications including vehicle applications and mobile electronic applications to provide an absolute position for a moving object according to satellite signals. A time to first fix (TTFF) parameter is an important parameter to evaluate the performance of the GPS. The TTFF parameter means the time to first fix the moving object after a GPS receiver starts. Generally, users want to fix the current position of the moving object in a shorter time after starting the GPS receiver.

The GPS receiver operates in several modes that include a cold starting mode, a warm starting mode and a hot starting mode according to different prior information stored in the GPS receiver. Generally, the GPS receiver operates in the cold starting mode when the GPS receiver starts to work. The cold starting mode means the GPS receiver starts in the condition with no prior information (e.g., satellite ephemeris, satellite almanac, prior position of the GPS receiver, clock information and etc.) stored in the GPS receiver.

FIG. 1 illustrates a flowchart 100 of operations performed by a conventional GPS receiver in the cold starting mode. As shown in FIG. 1, when the GPS receiver starts in the cold starting mode, the GPS receiver can acquire all the satellite signals in block 102, track the available satellite signals in block 104, capture the C/A codes from each of the satellite signals in block 106, demodulate the C/A codes to recover the navigation bits in block 108, synchronize navigation data subframe based on the navigation bits in block 110, gather satellite ephemeris in block 112, and fix a current position in block 114.

During the operation, the GPS receiver determines a first boundary of the navigation bits after receiving multiple C/A codes, and then starting from the boundary, demodulates the C/A codes to recover the navigation bits after the first boundary. Therefore, the navigation bits before the first boundary are not exploited because the C/A codes before the first boundary are not used but discarded. However, an enough number of navigation bits should be recovered in order to calculate the current position. As a result, the GPS receiver has to spend a relatively long time to recover the navigation bits after the first boundary for calculating the position. Therefore, it is to a GPS receiver system for fast recovery of the navigation bits that this invention is primarily directed.

SUMMARY OF THE INVENTION

The present invention provides a signal processing system for demodulating a plurality of navigation bits from a satellite signal. The signal processing system includes a digital baseband processor for determining a boundary between two navigation bits in the navigation bits according to a first plurality of coarse acquisition (C/A) codes captured from the satellite signals, storing the first plurality of C/A codes, and demodulating a second plurality of C/A codes captured after determining the boundary to recover a first series of the navigation bits. The signal processing system further includes a complementary demodulating unit coupled to the digital baseband processor for demodulating the first plurality of C/A codes to recover a second series of the navigation bits.

In another embodiment, the present invention provides a method for demodulating a plurality of navigation bits from a satellite signal. The method includes the steps of determining a boundary between two navigation bits in the navigation bits according to a first plurality of coarse acquisition (C/A) codes captured from the satellite signal, storing the first plurality of C/A codes, demodulating a second plurality of C/A codes captured after determining the boundary to recover a first series of the navigation bits, and demodulating the first plurality of C/A codes to recover a second series of the navigation bits.

In yet another embodiment, the present invention provides a global positioning systems (GPS) receiver including a signal processing system for demodulating a plurality of navigation bits from each of a plurality of satellite signals. The signal processing system includes a digital baseband processor for determining a boundary between two navigation bits in the navigation bits according to a first plurality of coarse acquisition (C/A) codes captured from the satellite signals, storing the first plurality of C/A codes in a storage unit, and demodulating a second plurality of C/A codes captured after determining the boundary to recover a first series of the navigation bits. The signal processing system further includes a complementary demodulating unit coupled to the digital baseband processor for demodulating the first plurality of C/A codes to recover a second series of the navigation bits, and a flow forming unit for concatenating the second series and the first series of the navigation bits sequentially to form a navigation bit flow. The GPS receiver further includes a navigation processor coupled to the signal processing system for calculating a current position according to the navigation bit flows of the satellite signals.

BRIEF DESCRIPTION OF THE DRAWINGS

Features and advantages of embodiments of the claimed subject matter will become apparent as the following detailed description proceeds, and upon reference to the drawings, wherein like numerals depict like parts, and in which:

DETAILED DESCRIPTION OF THE INVENTION

Reference will now be made in detail to embodiments of the present invention. While the invention will be described in conjunction with these embodiments, it will be understood that they are not intended to limit the invention to these embodiments. On the contrary, the invention is intended to cover alternatives, modifications and equivalents, which can be included within the spirit and scope of the invention as defined by the appended claims.

Furthermore, in the following detailed description of the present invention, numerous specific details are set forth in order to provide a thorough understanding of the present invention. However, it will be recognized by one of ordinary skill in the art that the present invention can be practiced without these specific details. In other instances, well known methods, procedures, components, and circuits have not been described in detail as not to unnecessarily obscure aspects of the present invention.

Embodiments in accordance with the present invention provide a signal processing system for demodulating navigation bits from satellite signals. The signal processing system includes a digital base-band processor for capturing C/A codes from input satellite signals continuously, determining a first boundary of the navigation bits according to a plurality of captured C/A codes and demodulating the C/A codes captured after determining the first boundary to recover a first series of the navigation bits following the first boundary. Furthermore, before determining the first boundary, the captured C/A codes can be stored in a database. The stored C/A codes can be demodulated to recover a second series of the navigation bits previous to the first boundary. Advantageously, the C/A codes captured before determining the first boundary can be stored and then used to recover the second series of the navigation bits which is complementary to the first series of the navigation bits. Hence the complementary navigation bits can help for determining the current position more quickly.

Generally, a satellite signal includes a carrier signal, a pseudo random noise (PRN) code, and navigation bits. Each satellite can modulate the navigation bits into a unique PRN code to spread spectrum of the navigation bits. Then the satellite modulates the PRN code with the navigation bits into a carrier signal and transmits out the carrier signal carrying the navigation bits and the PRN code as a satellite signal. In a civilian GPS application, the PRN code is also known as a C/A code.

Figure 1:
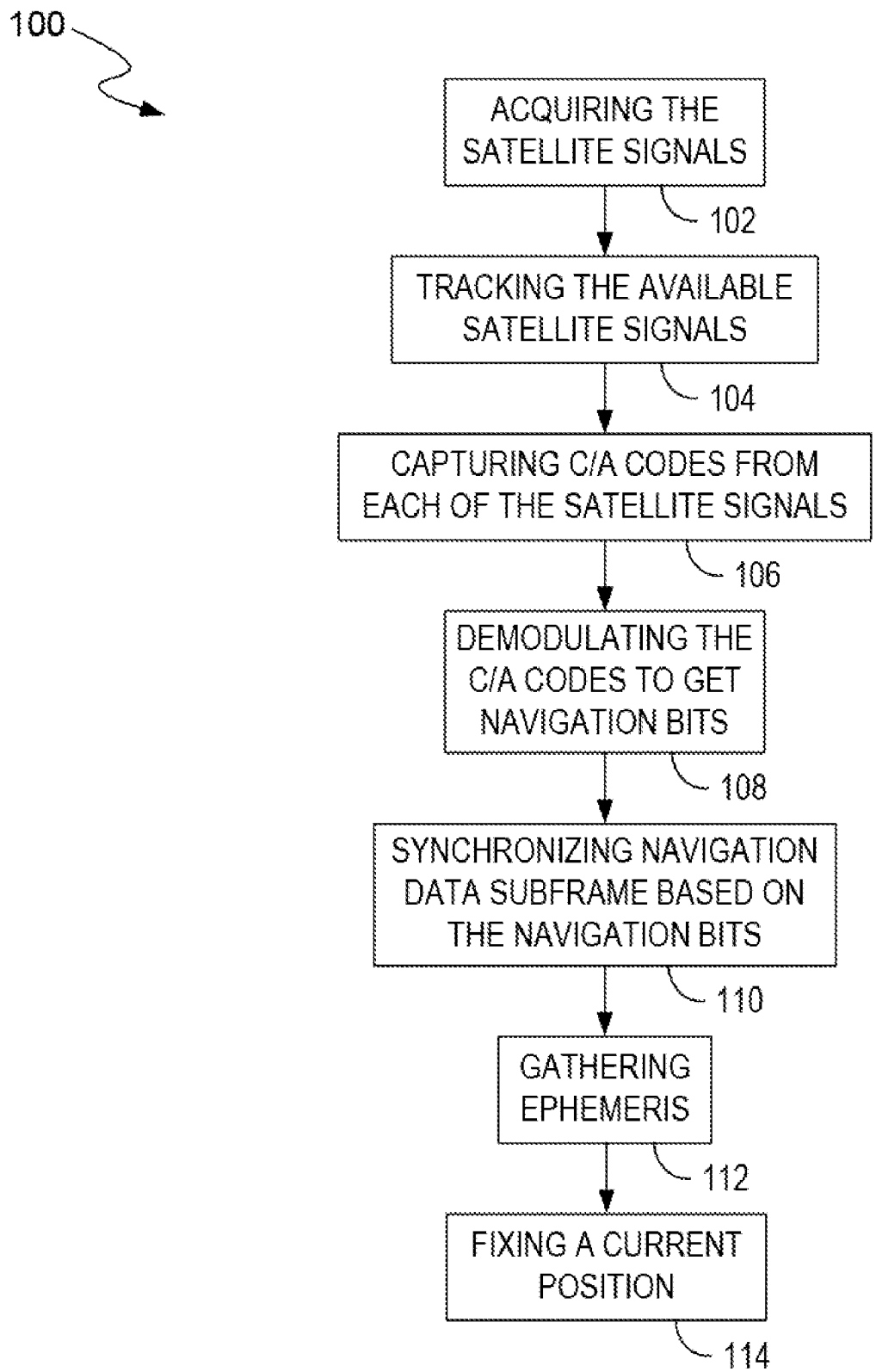
FIG. 1 illustrates a flowchart of prior art operations performed by a conventional GPS receiver in different starting modes.
Figure 2:
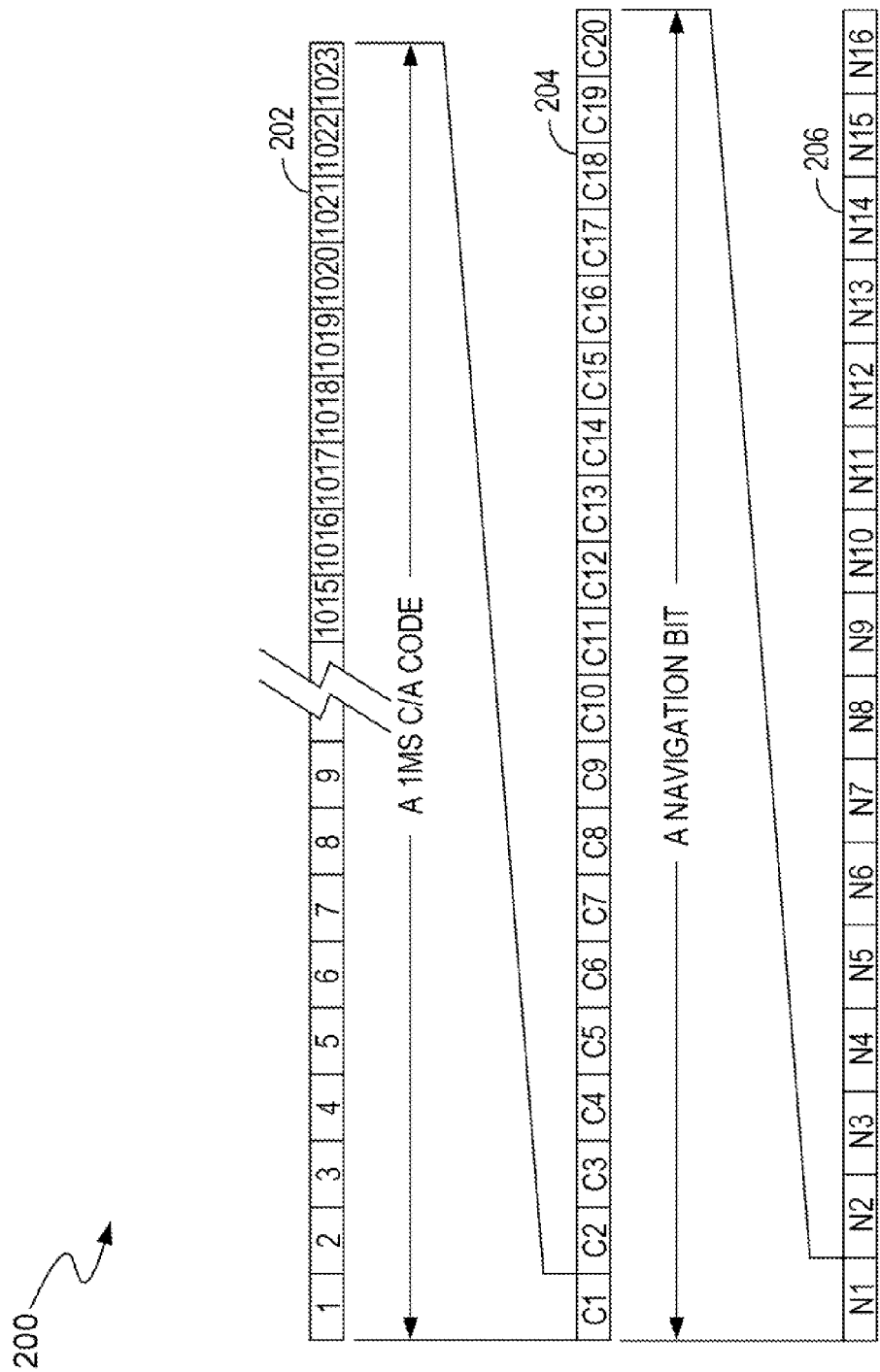
FIG. 2 illustrates a structure diagram of the navigation bits in accordance with one embodiment of the present invention.

A structure diagram 200 of the navigation bits is illustrated in FIG. 2 according to one embodiment of the present invention. In one embodiment, a C/A code 202 is composed of 1023 C/A code chips. The length of the C/A code 202 can be one second. The C/A code of one second length can be called as 1 ms C/A code for brevity. A navigation bit flow 206 can be composed of a series of navigation bits N1, N2, ..., N16 and etc. Each navigation bit in the navigation bit flow 206 has the same structure as a navigation bit 204. In one embodiment, the bit rate of the navigation bit flow 206 is 50 bit/s and thus the length of the navigation bit 204 is 20 ms. Since the navigation bits are modulated with a C/A code flow, the navigation bit 204 can be represented by 20 1 ms C/A codes, e.g., C1-C20.

Figure 3:
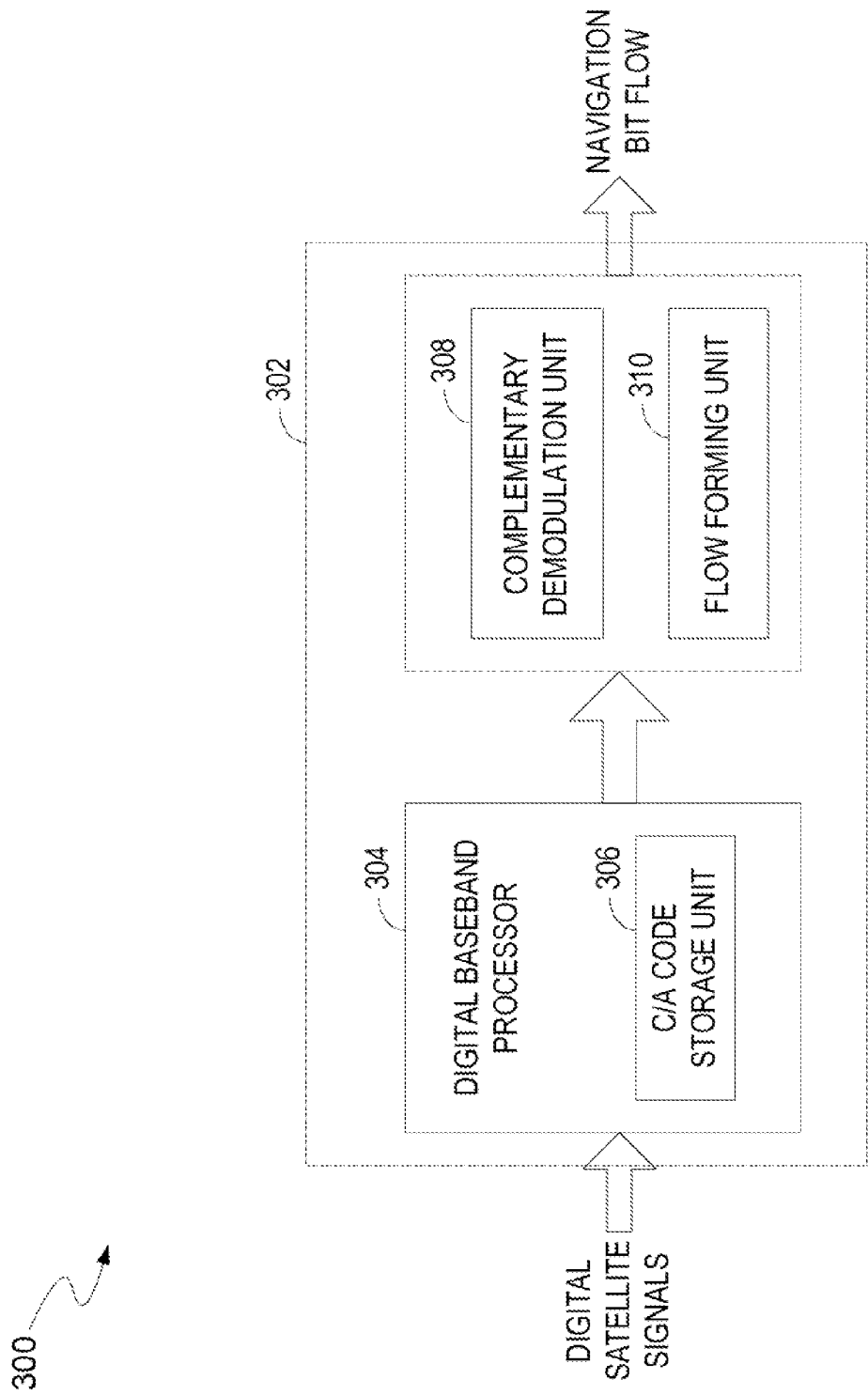
FIG. 3 illustrates a block diagram of a signal processing system for demodulating navigation bits from satellite signals in accordance with one embodiment of the present invention.

FIG. 3 illustrates a block diagram 300 of a signal processing system for demodulating navigation bits from satellite signals according to one embodiment of the present invention. FIG. 3 is described in combination with FIG. 2.

An antenna can acquire the satellite signals generated by satellites. Then the satellite signals can be amplified by an amplifier, converted from radio frequency (RF) to intermediate frequency (IF) by a RF/IF convertor, and converted from analog to digital (A/D) by an A/D convertor. In one embodiment, the digital satellite signals can be sent to a signal processing system 302 to demodulate navigation bits from the digital satellite signals.

After receiving the digital satellite signals, a digital baseband processor 304 can determine which of the digital satellite signals are available for GPS navigation. The digital baseband processor 304 can demodulate the navigation bits from the available digital satellite signals.

As described above, each satellite uses unique C/A code to spread the spectrum of the navigation bits. Cross-correlation between any two different CIA codes can be approximately zero. Auto-correlation between two same C/A codes is higher than a predetermined threshold only when phases of the two same C/A codes are the same. For each of the available digital satellite signals, the digital baseband processor 304 can capture the 1 ms C/A codes continuously from the corresponding digital satellite signal and determine a current phase of the 1 ms C/A codes according to the correlations between the digital satellite signal and the reference C/A codes of the satellites. The reference C/A codes of the satellites can be generated by an internal C/A code generator (not shown in FIG. 3).

Based on the current phase of the 1 ms C/A codes, the digital baseband processor 304 can determine boundaries of the 1 ms C/A codes. As described with FIG. 2, a navigation bit, e.g., the navigation bit 204, includes 20 1 ms C/A codes, e.g., C1-C20. Thus the digital baseband processor 304 can determine boundaries of the navigation bits according to the boundaries of the 1 ms C/A codes.

More specifically, according to the boundaries of the 1 ms C/A codes, the digital baseband processor 304 can calculate an integral value of each 1 ms C/A code. If the navigation bits joint in series have the same values, e.g., N1, N2 and N3 are bit 0 in the navigation bit flow 206, the integral values of the 1 ms C/A codes in N1, N2 and N3 can be approximately the same and have the same sign. If two navigation bits joint in series have different values, e.g., N3 is bit 0 and N4 is bit 1 in the navigation bit flow 206, the integral values of the 1 ms C/A codes in N3 can be different from the integral values of the 1 ms C/A codes in N4.

The digital baseband processor 304 can determine a first boundary of the navigation bits once two navigation bits joint in series are different. For example, if the navigation bits N1, N2, and N3 are the same and the navigation bit N4 is different from the previous navigation bits, the digital baseband processor 304 can determine a boundary between the navigation bits N3 and N4 according to the change of the integral values of the 1 ms C/A codes in these two navigation bits. Since starting from the first boundary every 20 1 ms C/A codes can be used to modulate a navigation bit, the digital baseband processor 304 can determine the boundaries of the followed navigation bits based on the first boundary.

Before determining the first boundary of the navigation bits, the digital baseband processor 304 stores the 1 ms C/A codes in sequence in a C/A code storage unit 306, in one embodiment. The 1 ms C/A codes can be represented as [C1, C2, ..., CN]. Alternatively, the digital baseband processor 304 can store the related information of the 1 ms C/A codes in sequence in the C/A code storage unit 306, e.g., integral values of the 1 ms C/A codes.

After determining the boundaries of the navigation bits, the digital baseband processor 304 can demodulate the 1 ms C/A codes captured continuously according to the determined boundaries to recover a series of navigation bits after the first boundary (current navigation bits), e.g., the bits N4, N5, ..., and N16 in the navigation bit flow 206. In one embodiment, the digital baseband processor 304 can determine a value of each navigation bit, e.g., bit 0 or bit 1, according to the integral values of 20 1 ms C/A codes between the start and the end boundaries of the navigation bit.

Furthermore, the digital baseband processor 304 can send the 1 ms C/A codes [C1, C2, ..., CN] stored in the C/A code storage unit 306 to a complementary demodulation unit 308 in sequence after determining the first boundary of the navigation bits. Subsequently, the complementary demodulation unit 308 can demodulate the stored 1 ms C/A codes [C1, C2, ..., CN] to recover a series of navigation bits before the first boundary (previous navigation bits), e.g., the bits N1, N2, and N3 in the navigation bit flow 206.

The complementary demodulation unit 308 can calculate a number bitcnt of the previous navigation bits modulated by the stored 1 ms C/A codes [C1, C2, ..., CN] according to equation (1).

$$\text{bitcnt} = \lfloor N/M \rfloor \quad (1)$$

N represents a number of the C/A codes stored in the C/A code storage unit 306. M represents a predetermined number of the C/A codes included in one navigation bit. In this embodiment, M can be 20. $\lfloor \ \rfloor$ represents a function which map a number, e.g., N/20, to the largest previous integer. More precisely, $\lfloor x \rfloor$ is the largest integer number smaller than x.

In this embodiment, each navigation bit includes 20 1 ms C/A code. Hence starting from the C/A code [CN], every 20 integral values of the C/A codes, e.g., [CN], [C(N-1)], [C(N-2)], ... [C(N-19)], can represent a navigation bit. Accordingly, in the 1 ms C/A codes [C1, C2, CN], the start position StartNavBit(i) of the 1 ms C/A codes included in a navigation bit $N_i$ in the previous navigation bits can be given by equation (2).

$$\text{StartNavBit}(i) = N - \text{bitcnt} \ast M + (i-1) \ast M + 1 = N - \text{bitcnt} \ast 20 + (i-1) \ast 20 + 1 \quad (2)$$

wherein i represents a serial number of the navigation bit $N_i$.

Similarly, the end position EndNavBit(i) of the 1 ms C/A codes for modulating the navigation bit can be given by equation (3).

$$\text{EndNavBit}(i) = \text{StartNavBit}(i) + M - 1 \quad (3)$$

Consequently, the complementary demodulation unit 308 can determine a value of the navigation bit $N_i$, e.g., bit 0 or bit 1, according to 20 1 ms C/A codes between the start position StartNavBit(i) and the end position EndNavBit(i).

In one embodiment, when the digital baseband processor 304 starts to demodulate the 1 ms C/A code captured after determining the first boundary to recover the current navigation bits, the complementary demodulation unit 308 can also start to demodulate the stored 1 ms C/A codes [C1, C2, ..., CN] to recover the previous navigation bits simultaneously. Alternatively, the complementary demodulation unit 308 can start to demodulate the stored 1 ms C/A codes before or after the digital baseband processor 304 starts to demodulate the 1 ms C/A code.

A flow forming unit 310 is used to form a navigation bit flow by sequentially concatenating the previous navigation bits and the current navigation bits output from the complementary demodulating unit 308 and the digital baseband processor 304 respectively. The navigation bit flow can indicate the navigation message of the corresponding satellite and can be output for further operation.

Figure 4:
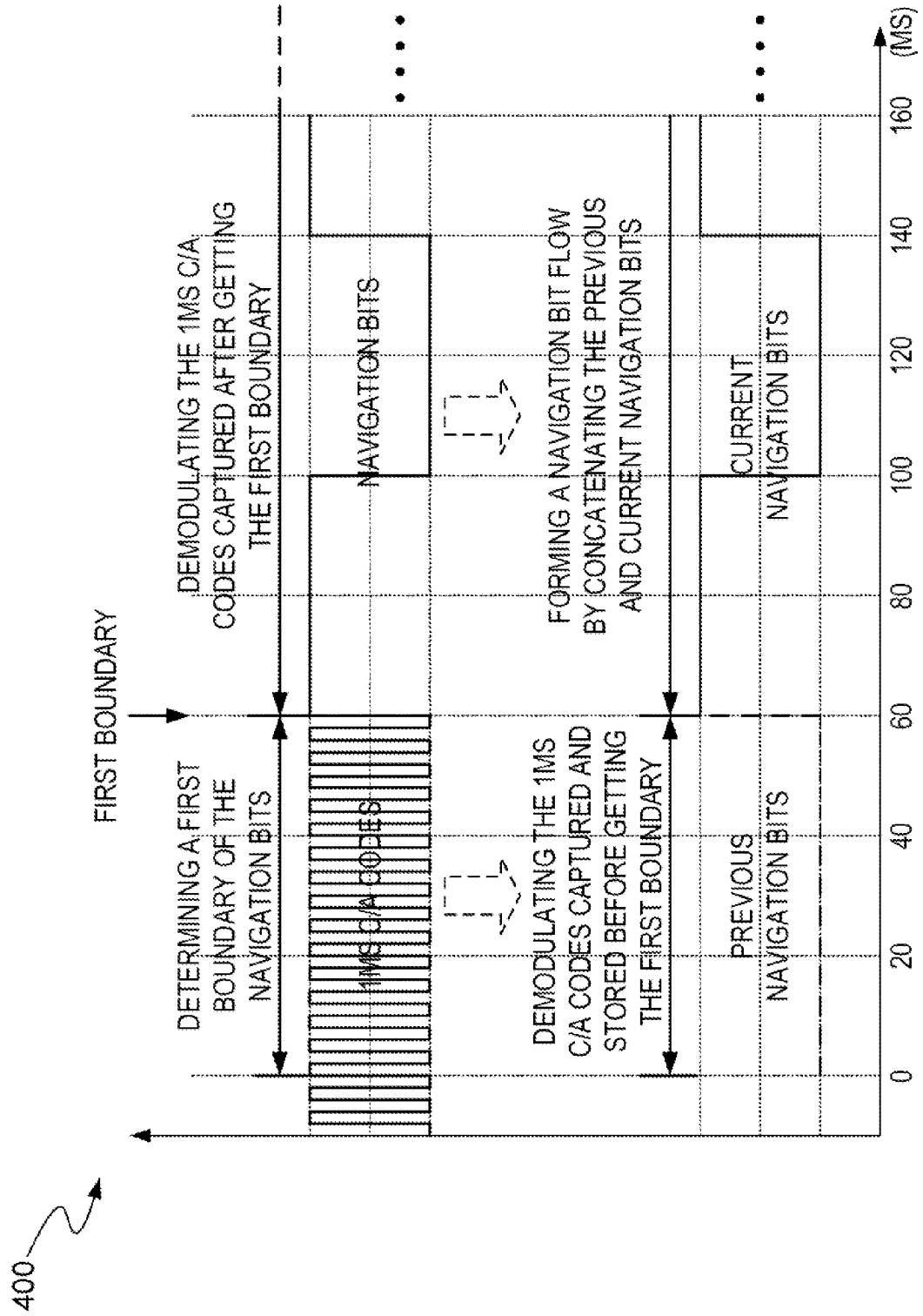
FIG. 4 illustrates a schematic diagram of forming a navigation bit flow in accordance with one embodiment of the present invention.

FIG. 4 illustrates a schematic diagram 400 for forming a navigation bit flow according to one embodiment of the present invention. FIG. 4 is described in combination with FIG. 3. As shown in FIG. 4, when the signal processing system 302 starts to operate, the digital baseband processor 304 captures the 1 ms C/A codes from the digital satellite signals and determines a first boundary of the navigation bits according to the boundaries of the 1 ms C/A codes. Then the digital baseband processor 304 demodulate the 1 ms C/A codes captured after determining the first boundary based on the first boundary to recover the current navigation bits. Furthermore, after determining the first boundary, the 1 ms C/A codes stored in the C/A code storage unit 306 can be demodulated to recover the previous navigation bits. The previous navigation bits and the current navigation bits can be concatenated sequentially to form a navigation bit flow.

Accordingly, before determining the first boundary of the navigation bits, the captured C/A code can be stored sequentially in the C/A code storage unit 306. After determining the first boundary, the complementary demodulation unit 308 can demodulate the stored C/A code to recover the previous navigation bits, which can be used with the current navigation bits output from the digital baseband processor 304 to determine the current position more quickly.

Figure 5:
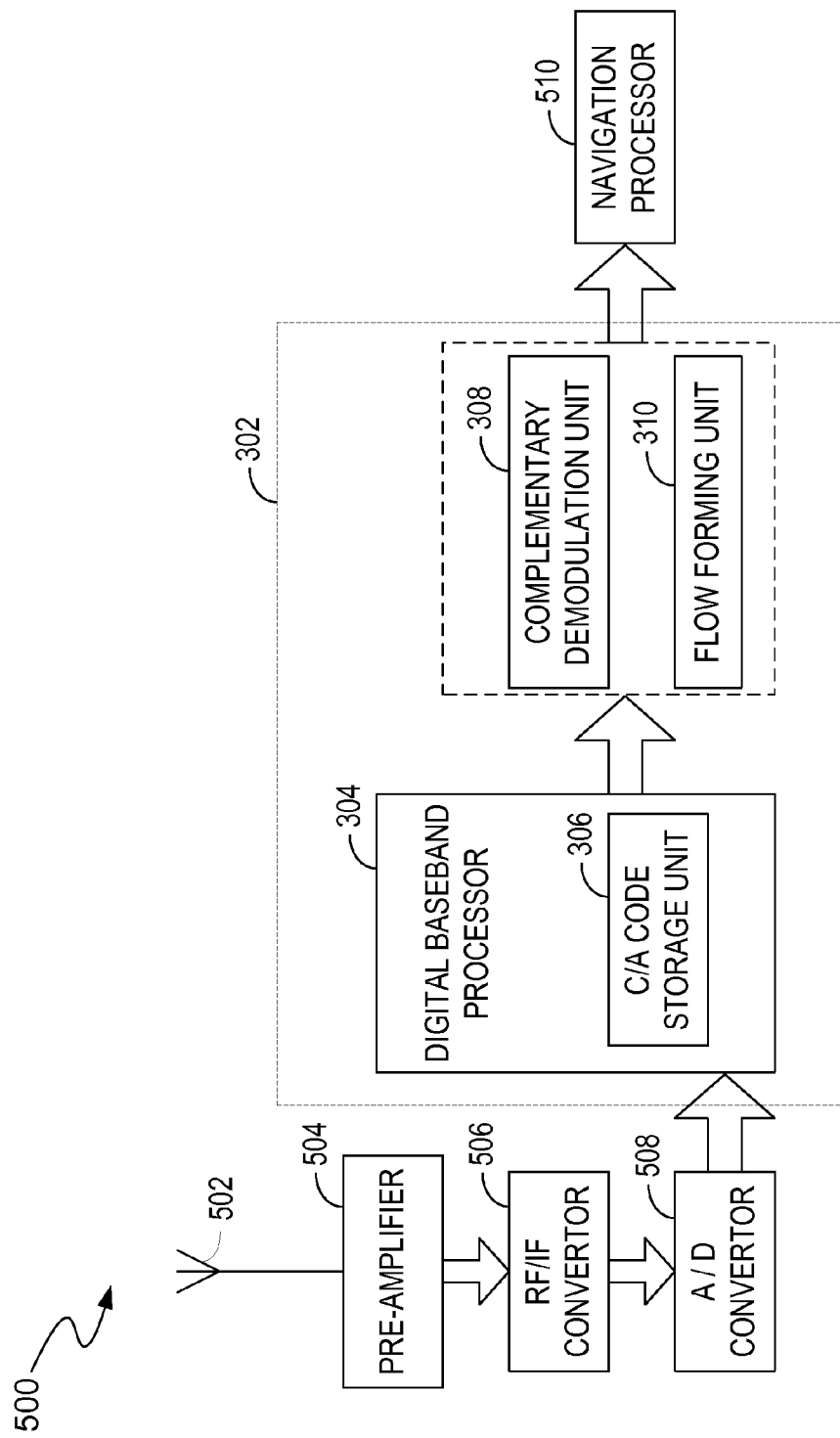
FIG. 5 illustrates a block diagram of a GPS receiver in accordance with one embodiment of the present invention.

FIG. 5 illustrates a block diagram of a GPS receiver 500 according to one embodiment of the present invention. Elements that are labeled the same as in FIG. 3 have similar functions and will not be described herein. FIG. 5 is described in combination with FIG. 3.

As shown in FIG. 5, the GPS receiver 500 can receive satellite signals from multiple satellites via an antenna 502 and amplify the satellite signals by a pre-amplifier 504. A radio frequency to intermediate frequency (RF/IF) convertor 506 can convert the frequency of the amplified satellite signals from a radio frequency to an intermediate frequency. An analog-to-digital converter 508 can digitize the satellite signals at a predetermined sampling frequency and generate digital satellite signals to the signal processing system 302.

As described above, the signal processing system 302 can determine the availability of the digital satellite signals and demodulate each of the available digital satellite signals to recover the navigation bits and form a navigation bit flow by sequentially concatenating the navigation bits. A navigation processor 510 can calculate a position of the GPS receiver 500 according to navigation message indicated by the navigation bit flows of the available digital satellite signals.

In one embodiment, the complementary demodulation unit 308 and the flow forming unit 310 can be implemented via hardware and/or firmware. Alternatively, the complementary demodulation unit 308 and the flow forming unit 310 can be implemented by software. Additionally, the GPS receiver 500 can have other configurations and is not limited to the architectures illustrated in FIG. 3 and FIG. 5, e.g., the complementary demodulation unit 308 and the flow forming unit 310 can be integrated in the digital baseband processor 304 or in the navigation processor 510.

Figure 6:
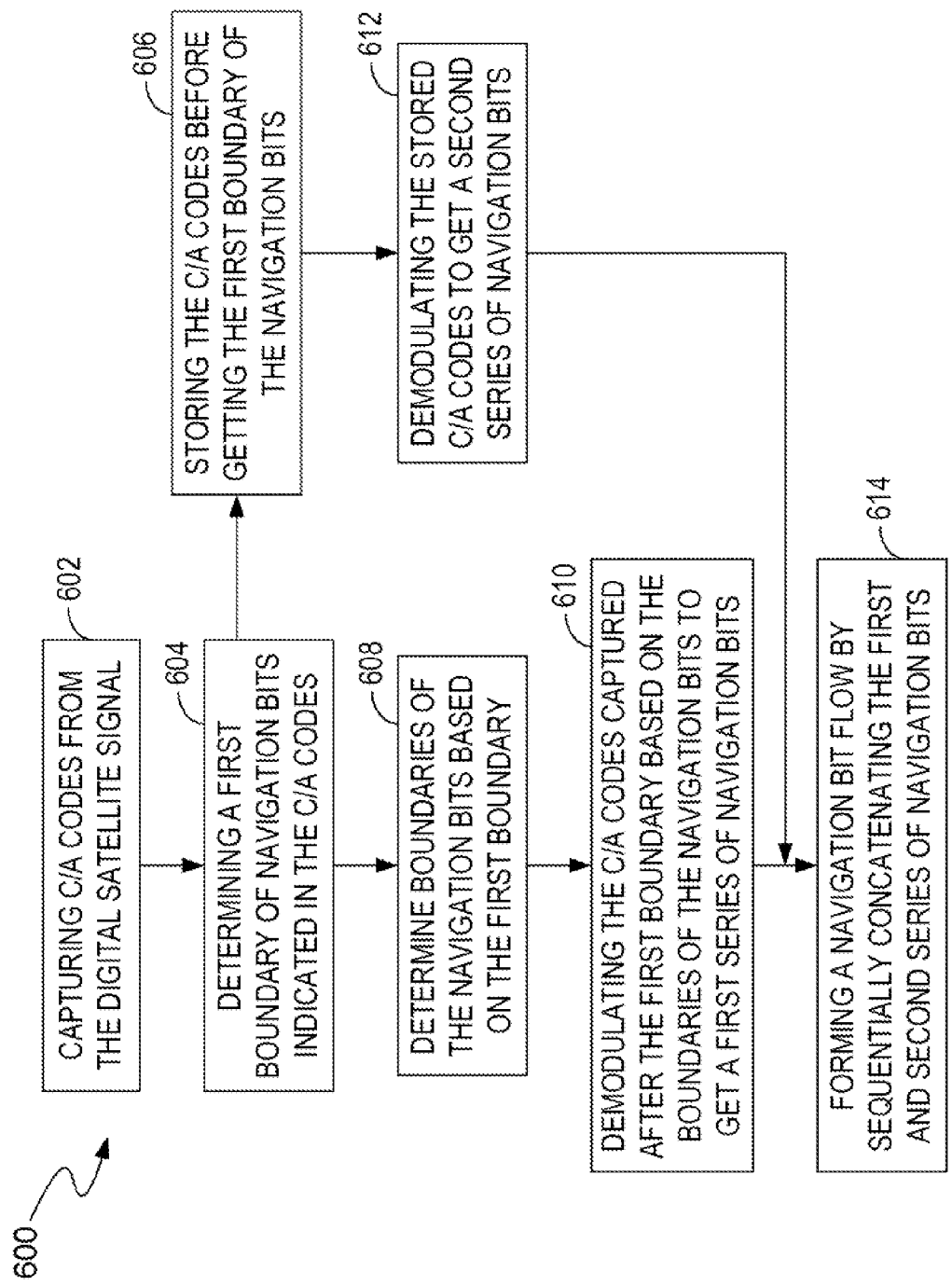
FIG. 6 illustrates a flowchart of operations for demodulating navigation bits from an available digital satellite signal in accordance with one embodiment of the present invention.

FIG. 6 illustrates a flowchart 600 of operations for demodulating navigation bits from an available digital satellite signal according to one embodiment of the present invention. FIG. 6 is described in combination with FIG. 3.

In block 602, the digital baseband processor 304 can capture the C/A codes, e.g., 1 ms C/A codes, from the available digital satellite signal continuously. In block 604, the digital baseband processor 304 determines a first boundary of the navigation bits based on the boundary of the C/A codes.

In block 606, the C/A codes can be stored in the C/A code storage unit 306 before determining the first boundary of the navigation bits. In block 608, after determining the first boundary of the navigation bits, the digital baseband processor 304 determines boundaries of the navigation bits based on the first boundary. In block 610, the digital baseband processor 304 demodulates the C/A codes captured after the first boundary based on the determined boundaries of the navigation bits to recover a series of navigation bits following the first boundary (current navigation bits).

Furthermore, after determining the first boundary, the complementary demodulation unit 308 demodulates the C/A codes stored in the C/A code storage unit 306 to recover a series of navigation bits previous to the first boundary (previous navigation bits) in block 612.

For each of the previous navigation bits, the complementary demodulation unit 308 can calculate a start position StartNavBit(i) of a series of the C/A codes in the C/A codes stored in the C/A code storage unit 306 according to equation (1). The series of the C/A codes can indicate a navigation bit $N_i$.

$$\text{StartNavBit}(i) = N - \lfloor N/M \rfloor * M + (i-1) * M + 1 \quad (1)$$

N represents a number of the C/A codes stored in the C/A code storage unit 306. M represents a predetermined number of the C/A codes for modulating one navigation bit. i represents a serial number of the navigation bit $N_i$ in the previous navigation bits.

The complementary demodulation unit 308 can further calculate an end position EndNavBit(i) of the series of the C/A codes in the C/A codes stored in the C/A code storage unit 306 according to equation (2).

$$\text{EndNavBit}(i) = N - \lfloor N/M \rfloor * M + i * M \quad (2)$$

Subsequently, the complementary demodulation unit 308 can determine a value of the navigation bit $N_i$ according to integral values of the series of the C/A codes between the start position StartNavBit(i) and the end position EndNavBit(i) in the C/A codes stored in the C/A code storage unit 306.

In one embodiment, the steps in block 610 and 612 can be operated synchronously. Alternatively, the steps in block 610 and 612 can be operated asynchronously.

In block 614, the previous navigation bits and the current navigation bits output from the complementary demodulating unit 308 and the digital baseband processor 304 respectively can be sequentially concatenated to form a navigation bit flow. The navigation bit flow indicates the navigation message of the corresponding satellite and can be output for further operation.

Figure 7:
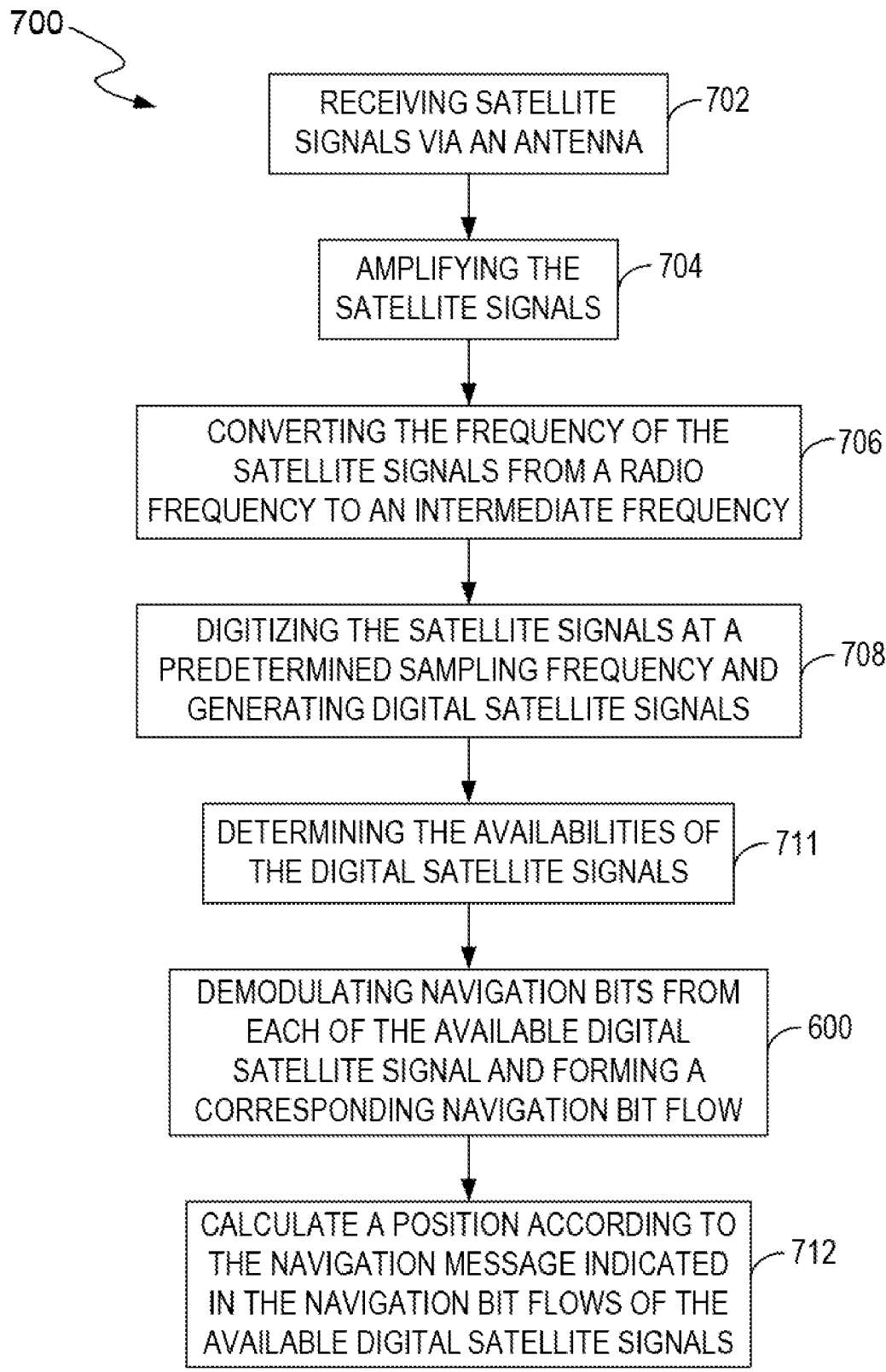
FIG. 7 illustrates a flowchart of operations performed by a GPS receiver in accordance with one embodiment of the present invention.

FIG. 7 illustrates a flowchart 700 of operations performed by a GPS receiver, e.g., the GPS receiver 500 in FIG. 5, according to one embodiment of the present invention. Elements that are labeled the same as in FIG. 6 have similar functions. FIG. 7 is described in combination with FIG. 3, FIG. 5 and FIG. 6.

When the GPS receiver 500 starts to work, the GPS receiver 500 can receive satellite signals from the satellites via the antenna 502 in block 702. In block 704, the GPS receiver 500 amplifies the satellite signals via the pre-amplifier 504. In block 706, the GPS receiver 500 converts the frequency of the satellite signals from a radio frequency to an intermediate frequency via the RF/IF convertor 506. In block 708, the GPS receiver 500 digitizes the satellite signals at a predetermined sampling frequency and generates digital satellite signals to the signal processing system 302.

In block 710, the signal processing system 302 determines the availabilities of the digital satellite signals. Subsequently, the signal processing system 302 can demodulate navigation bits from each of the available digital satellite signal and form a corresponding navigation bit flow according to the flowchart 600 illustrated in FIG. 6. The block 711 can include the blocks 602-614. In block 712, the navigation processor 10 calculates a position according to the navigation message indicated in the navigation bit flows output from the signal processing system 302.

Accordingly, the embodiments in accordance with the present invention provide a signal processing system, e.g., the signal processing system 302, for demodulating navigation bits from the satellite signals. When a digital satellite signal is sent to the signal processing system 302, the digital baseband processor 304 can capture C/A codes, e.g., 1 ms C/A codes, from the digital satellite signal and determine boundaries of the C/A codes. Based on the boundaries of the C/A codes, the digital baseband processor 304 can determine a first boundary of the navigation bits. Furthermore, before determining the first boundary of the navigation bits, the captured C/A codes can be stored sequentially in the C/A code storage unit 306.

After determining the first boundary of the navigation bits, the digital baseband processor 304 can demodulate the C/A codes captured after the first boundary to recover a series of navigation bits following the first boundary (current navigation bits). Simultaneously, the complementary demodulation unit 308 can demodulate the C/A codes stored in the C/A code storage unit 306 to recover a series of navigation bits previous to the first boundary (previous navigation bits). Subsequently, the previous and the current navigation bits can be sequentially concatenated to determine a current position more quickly.

While the foregoing description and drawings represent embodiments of the present invention, it will be understood that various additions, modifications and substitutions may be made therein without departing from the spirit and scope of the principles of the present invention as defined in the accompanying claims. One skilled in the art will appreciate that the invention may be used with many modifications of form, structure, arrangement, proportions, materials, elements, and components and otherwise, used in the practice of the invention, which are particularly adapted to specific environments and operative requirements without departing from the principles of the present invention. The presently disclosed embodiments are therefore to be considered in all respects as illustrative and not restrictive, the scope of the invention being indicated by the appended claims and their legal equivalents, and not limited to the foregoing description.

What is claimed is:

1. A signal processing system for demodulating a plurality of navigation bits from a satellite signal, comprising:

a digital baseband processor for determining a boundary between two navigation bits in said navigation bits according to a first plurality of coarse acquisition (C/A) codes captured from said satellite signals, storing said first plurality of C/A codes, and demodulating a second plurality of C/A codes captured after determining said boundary to recover a first series of said navigation bits; and a complementary demodulating unit coupled to said digital baseband processor for demodulating said first plurality of C/A codes to recover a second series of said navigation bits, wherein said complementary demodulating unit is capable of:

calculating a start position of a series of C/A codes in said first plurality of C/A codes, said series of C/A codes being used for modulating a corresponding navigation bit in said second series of said navigation bits;

calculating an end position of said series of C/A codes in said first plurality of C/A codes; and determining a value of said corresponding navigation bit according to integral values of said series of C/A codes between said start position and said end position in said first plurality of C/A codes.

2. The signal processing system of claim 1, further comprising:
a C/A code storage unit for storing said first plurality of C/A code.

3. The signal processing system of claim 1, further comprising:
a flow forming unit for concatenating said second series and said first series of said navigation bits sequentially to form a navigation bit flow.

4. The signal processing system of claim 1, wherein said complementary demodulating unit calculates said start position according to equation (1), $$\text{StartNavBit}(i) = N - \lfloor N/M \rfloor * M + (i-1) * M + 1 \quad (1)$$

wherein StartNavBit(i) represents said start position, N represents a number of said first plurality of C/A codes, M represents a predetermined number of C/A codes for modulating one navigation bit, i represents a serial number of said corresponding navigation bit in said second series of said navigation bits.

5. The signal processing system of claim 1, wherein said complementary demodulating unit calculates said end position according to equation (2), $$\text{EndNavBit}(i) = N - \lfloor N/M \rfloor * M + i * M \quad (2)$$

wherein EndNavBit(i) represents said end position, N represents a number of said first plurality of C/A codes, M represents a predetermined number of C/A codes for modulating one navigation bit, i represents a serial number of said corresponding navigation bit in said second series of said navigation bits.

6. A method for demodulating a plurality of navigation bits from a satellite signal, comprising the steps of:
determining a boundary between two navigation bits in said navigation bits according to a first plurality of coarse acquisition (C/A) codes captured from said satellite signal;
storing said first plurality of C/A codes;
demodulating a second plurality of C/A codes captured after determining said boundary to recover a first series of said navigation bits;
demodulating said first plurality of C/A codes to recover a second series of said navigation bits;
calculating a start position of a series of C/A codes in said first plurality of C/A codes, said series of C/A codes being used for modulating a corresponding navigation bit in said second series of said navigation bits;
calculating an end position of said series of C/A codes in said first plurality of C/A codes; and
determining a value of said corresponding navigation bit according to integral values of said series of C/A codes between said start position and said end position in said first plurality of C/A codes.

7. The method of claim 6, further comprising the step of:
storing said first plurality of C/A code in a C/A code storage unit.

8. The method of claim 6, further comprising the step of:
concatenating said second and first series of said navigation bits sequentially to form a navigation bit flow.

9. The method of claim 6, further comprising the step of:
calculating said start position according to equation (1), $$\text{StartNavBit}(i) = N - \lfloor N/M \rfloor * M + (i-1) * M + 1 \quad (1)$$

wherein StartNavBit(i) represents said start position, N represents a number of said first plurality of C/A codes, M represents a predetermined number of C/A codes for modulating one navigation bit, i represents a serial number of said corresponding navigation bit in said second series of said navigation bits.

10. The method of claim 6, further comprising the step of:
calculating said end position according to equation (2), $$\text{EndNavBit}(i) = N - \lfloor N/M \rfloor * M + i * M \quad (2)$$

wherein EndNavBit(i) represents said end position, N represents a number of said first plurality of C/A codes, M represents a predetermined number of C/A codes for modulating one navigation bit, i represents a serial number of said corresponding navigation bit in said second series of said navigation bits.

11. A global positioning systems (GPS) receiver, comprising:
a signal processing system for demodulating a plurality of navigation bits from each of a plurality of satellite signals, comprising:
a digital baseband processor for determining a boundary between two navigation bits in said navigation bits according to a first plurality of coarse acquisition (C/A) codes captured from said satellite signals, storing said first plurality of C/A codes in a storage unit, and demodulating a second plurality of C/A codes captured after determining said boundary to recover a first series of said navigation bits;
a complementary demodulating unit coupled to said digital baseband processor for demodulating said first plurality of C/A codes to recover a second series of said navigation bits;
a flow forming unit for concatenating said second series and said first series of said navigation bits sequentially to form a navigation bit flow; and
a navigation processor coupled to said signal processing system for calculating a current position according to said navigation bit flows of said satellite signals;
wherein said complementary demodulating unit is capable of:
calculating a start position of a series of C/A codes in said first plurality of C/A codes, said series of C/A codes being used for modulating a corresponding navigation bit in said second series of said navigation bits;
calculating an end position of said series of C/A codes in said first plurality of C/A codes; and
determining a value of said corresponding navigation bit according to integral values of said series of C/A codes between said start position and said end position in said first plurality of C/A codes.

12. The GPS receiver of claim 11, further comprising:
a C/A code storage unit for storing said first plurality of C/A code.

13. The GPS receiver of claim 11, wherein said complementary demodulating unit calculates said start position according to equation (1), $$\text{StartNavBit}(i) = N - \lfloor N/M \rfloor * M + (i-1) * M + 1 \quad (1)$$

wherein StartNavBit(i) represents said start position, N represents a number of said first plurality of C/A codes, M represents a predetermined number of C/A codes for modulating one navigation bit, i represents a serial number of said corresponding navigation bit in said second series of said navigation bits.

14. The GPS receiver of claim 11, wherein said complementary demodulating unit calculates said end position according to equation (2), $$EndNavBit(i)=N-\lfloor N/M \rfloor *M+i*M \quad (2)$$

wherein EndNavBit(i) represents said end position, N represents a number of said first plurality of C/A codes, M represents a predetermined number of C/A codes for modulating one navigation bit, i represents a serial number of said corresponding navigation bit in said second series of said navigation bits.

* * * * *